United States Patent [19]

Mullin et al.

[11] Patent Number: 4,852,965

[45] Date of Patent: Aug. 1, 1989

[54] COMPOSITE SERVICE AND DISTRIBUTION COMMUNICATIONS MEDIA

[75] Inventors: Francis J. Mullin, Chamblee; William C. Reed, Lilburn, both of Ga.

[73] Assignee: American Telephone and Telegraph Company AT&T Bell Laboratories, Murray Hill, N.J.

[21] Appl. No.: 19,719

[22] Filed: Feb. 27, 1987

[51] Int. Cl.$^4$ .............................. G02B 6/44
[52] U.S. Cl. ................................... 350/96.23
[58] Field of Search ........................ 350/96.23

[56] References Cited

U.S. PATENT DOCUMENTS

| | | | |
|---|---|---|---|
| 3,710,006 | 1/1973 | Davis | 350/96.23 X |
| 4,054,365 | 10/1977 | Marx et al. | 350/96.23 |
| 4,097,119 | 6/1978 | Kumamaru et al. | 350/96.23 |
| 4,110,001 | 8/1978 | Olszewski et al. | 350/96.23 |
| 4,143,942 | 3/1979 | Anderson | 350/96.23 |
| 4,241,979 | 12/1980 | Gagen et al. | 350/96.23 |
| 4,259,540 | 3/1981 | Sabia | 350/96.23 |
| 4,464,013 | 8/1984 | Sabia | 350/96.23 |

FOREIGN PATENT DOCUMENTS 3024310  1/1982  Fed. Rep. of Germany ... 350/96.23

*Primary Examiner*—Frank Gonzalez
*Assistant Examiner*—Phan T. Heartney
*Attorney, Agent, or Firm*—Edward W. Somers

[57] ABSTRACT

A cable (20) which may be used in an aerial or buried installation to serve customers' premises and which is a composite optical fiber-copper conductor type serves present customer needs but has the capability to fulfill the service requirements predicted in the communications market of tomorrow. The cable includes one or more reinforced optical fiber units (22—22) and one or more metallic conductor pairs enclosed in a sheath system. Each optical fiber unit is reinforced to include a plurality of strength members (40—40) arrayed about a buffered optical fiber (36) to enclose the optical fiber and to provide columnar strength to resist compressive forces. A filling compound (52) is disposed within the unit between a jacket (50) which encloses the strength members and the buffered optical fiber.

28 Claims, 5 Drawing Sheets

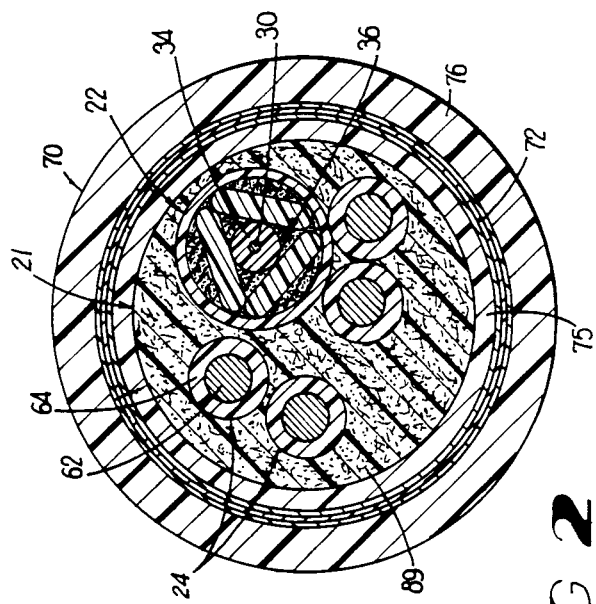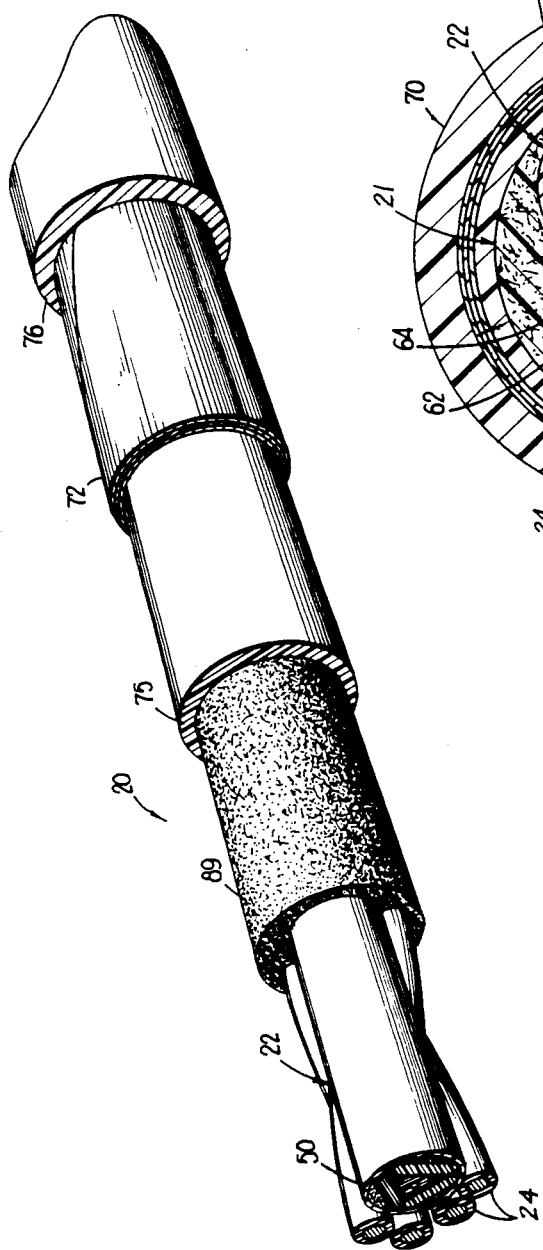
FIG. 1
FIG. 2

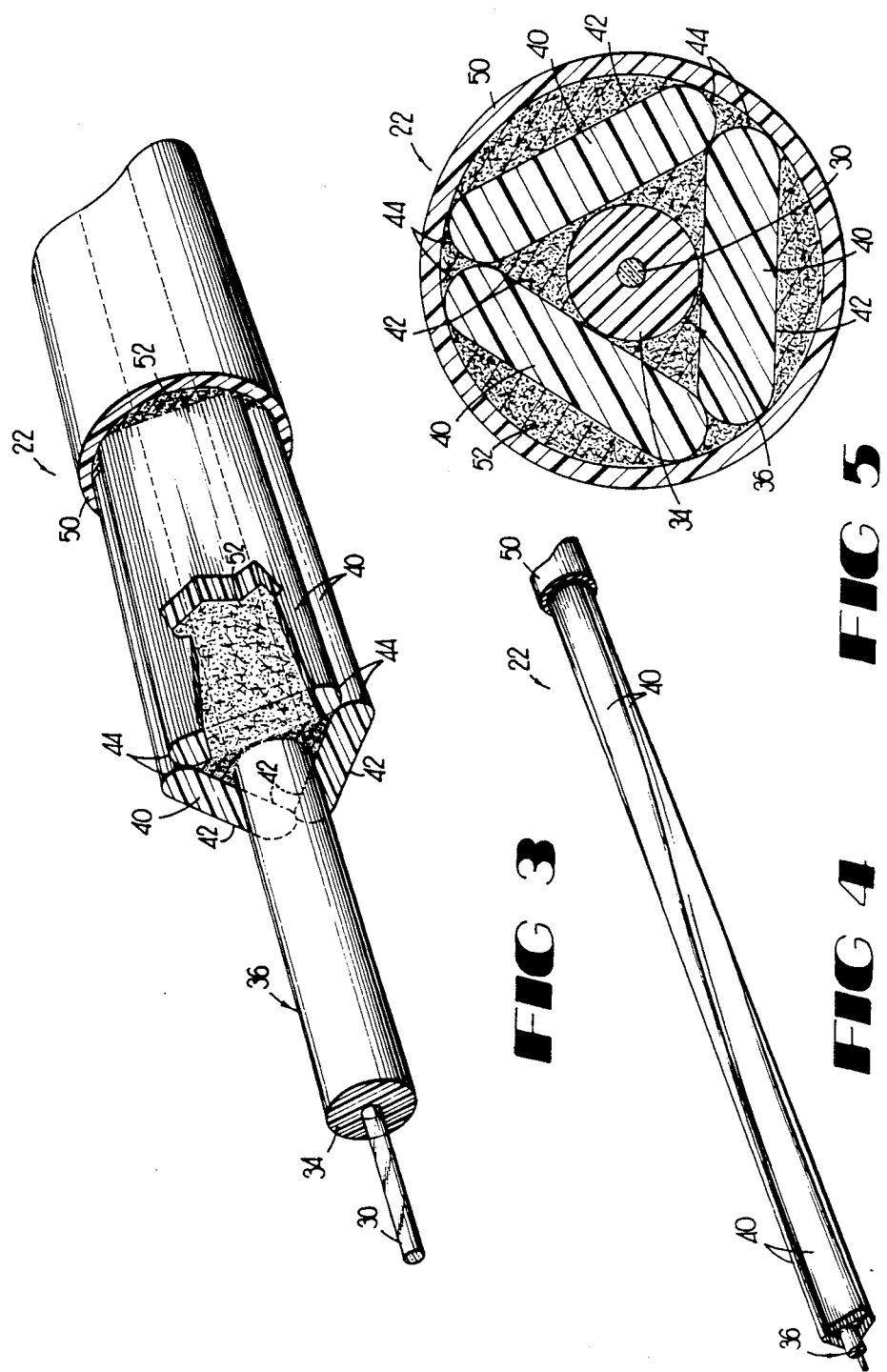

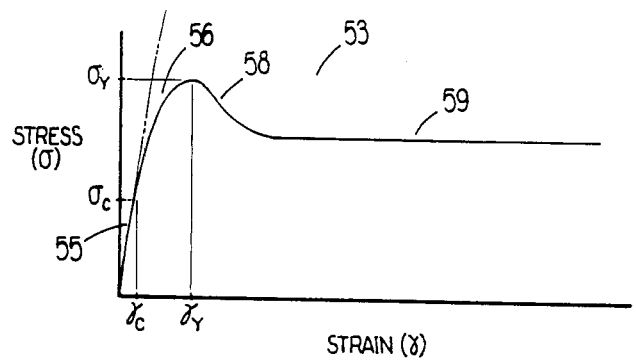
FIG 6
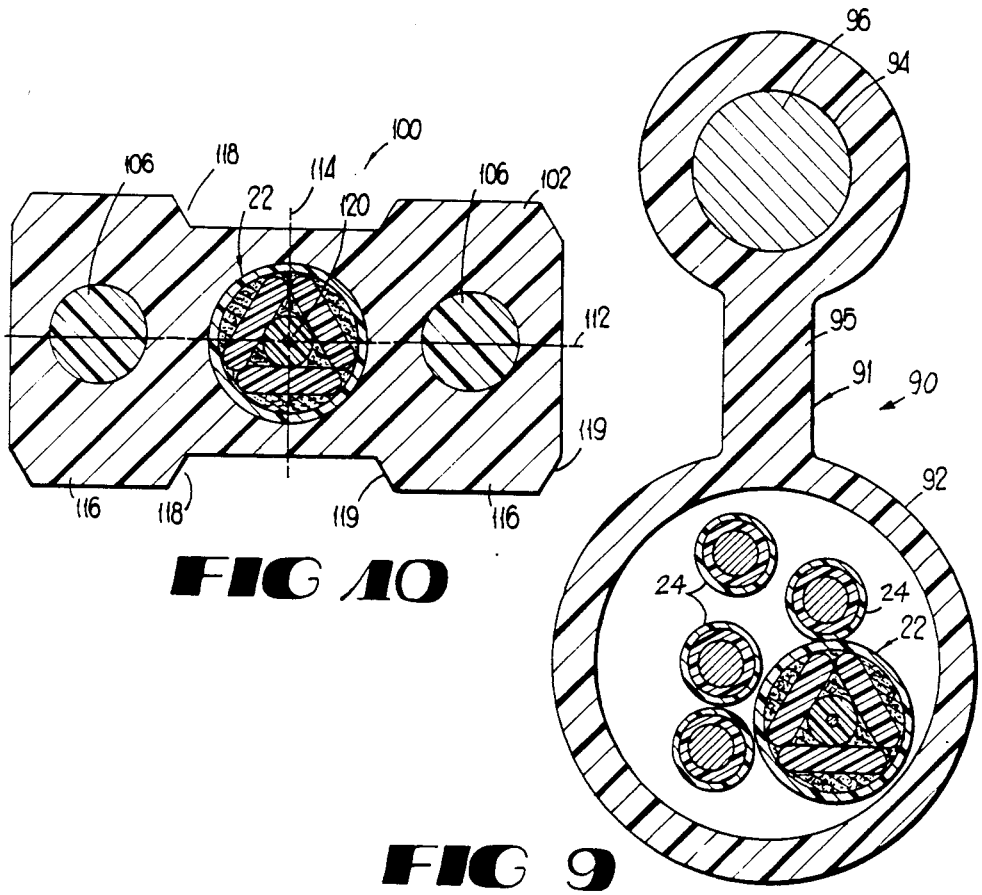
FIG 10
FIG 9

COMPOSITE SERVICE AND DISTRIBUTION COMMUNICATIONS MEDIA

TECHNICAL FIELD

This invention relates to composite service and distribution communications media. More particularly, it relates to a cable which includes a reinforced optical fiber unit and metallic conductors and which may be strung up in an aerial or plowed in a buried mode or introduced into an earlier placed conduit to provide service and distribution media.

BACKGROUND OF THE INVENTION

Telephone service to the home has been provided by aerial or buried service wire. Typically each of these has included a pair of metallic conductors such as cooper wires enclosed in a jacket. For purposes of self-support, the aerial wire also has included at least one strength member.

The use of optical fibers in communications has grown significantly over the past few years. It is anticipated that its use will reach into the residential loop distribution system in the near future. For now, loop distribution cables which include insulated metallic conductors continue to be installed.

Nevertheless, operating telephone companies have expressed a desire to install cables which include optical fibers as well as metallic conductors. Such a course of action of early placement of optical fibers in aerial or buried installations to customers' premises will facilitate the later transition from a metallic to an optical fiber operating system. Obviously, the first cost of installing optical fiber to customers' premises is minimized by such an approach. With such a cable, optical fiber can be provided to customers' premises awaiting the arrival of the optical fiber network and development of associated hardware and electronics.

Such composite cables will be placed by the same methods and apparatus as are used for all-copper cables. Accordingly, the optical fiber portion thereof must be robust enough to withstand plowing and trenching or aerial stringing of a host structure and to be capable of survival outside the host structure in a separate run to an optical fiber storage or termination point.

With such a cable structure in place, service will evolve from the metallic pairs to the optical fibers. Simple telephone service can begin immediately over a metallic pair of conductors. Other metallic conductor pairs of the distribution and service cable can serve as secondary lines or alarm circuits. Initially, the optical fiber unit may be used to provide cable television or retained for later use.

At a later date, more sophisticated offerings which require increased bandwidth and customer interaction such as, for example, electronic newspapers and mail, catalogs and shopping, banking and business activities and data and computer functions may be served through a remote terminal. For this application, metallic conductor pairs may provide power to on-premise electronics or serve as control circuits. Still later, all offerings may be provided over the optical fiber media, but power still will have to be provided for on-site electronics by the power or telephone operating company. Providing power from a central office source through these structures should result in reliable telecommunications during power outages. Also, the copper conductor pairs may have other uses such as circuit maintenance, for example.

The sought-after cable should have desired properties. For example, it should have a relatively high tensile and compressive axial loading capability, a relatively low minimum bend radius, stiffness against bend losses in order to insure that the optical fiber unit does not follow the twists and turns of neighboring twisted pairs and should remain as straight as possible to minimize bend losses, an operating temperature range of about $-40°$ to $+160°$ F., single mode capability and low cost. The cable should be properly cushioned to withstand repeated impacts by vehicles on structures routed across roadways during installation. Also, the structure must not be affected adversely by cable filling compounds. The cable must be water-resistant to prevent damage due to water-induced crack propagation or freezing. Inasmuch as in some instances it will connect to customers' premises, the cable must be capable of being made flame retardant.

Seemingly, the prior art is devoid of such a cable which provides both metallic and optical fiber conductors along with the desired properties. Single optical fiber cables having an optical fiber and strength member yarn disposed between the optical fiber and a plastic jacket are available commercially. However, such a cable does not provide columnar strength in compression and is not suitable for outside plant, particularly at relatively low temperatures. The sought-after cable will fill a need in the marketplace as services to the home are expanded.

SUMMARY OF THE INVENTION

The foregoing problem has been solved by the cable of this invention. The cable of this invention includes at least one reinforced optical fiber unit which includes at least one optical fiber and which may or may not include a buffer layer of plastic material that encloses the optical fiber. The reinforced optical fiber unit may be referred to as a lightguide reinforced unit. Also, the unit includes a plurality of impregnated fiber glass strength members each having a cross section which includes two generally parallel sides which are joined at their ends by arcuate portions. The strength members enclose the optical fiber in a manner which allows the fiber to float within the strength members and which provides columnar strength to resist compressive forces. A jacket which is made of a plastic material encloses the array of strength members. Disposed in the interstices between the jacket and the strength members and between the strength members and the optical fiber is a waterblocking material. In one embodiment, the cable also includes at least one insulated metallic conductor. A sheath system encloses the optical fiber unit and any metallic conductors. In a preferred embodiment the cable includes at least one pair of insulated metallic conductors. The sheath system includes an outer plastic jacket and in some instances a metallic shield which is disposed between the jacket and the core. For some applications, a flame-retardant waterblocking material is disposed within the sheath system about the reinforced optical fiber unit and any metallic conductors.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a composite optical fiber-metallic conductor cable of this invention;

FIG. 2 is a cross sectional end view of the cable of FIG. 1;

FIG. 3 is a perspective view of a reinforced optical fiber unit;

FIG. 4 is a perspective view of a portion of the reinforced optical fiber unit of FIG. 3;

FIG. 5 is a cross sectional end view of the reinforced optical fiber unit of FIG. 3;

FIG. 6 is an exemplary curve of applied stress versus strain for a waterblocking material of the reinforced optical fiber unit of FIG. 3;

FIG. 9 is a cross sectional end view of a cable of this invention which is suitable for aerial self-support systems;

FIG. 10 is a cross sectional end view of an all-dielectric aerial service cable which employs the reinforced optical fiber unit of this invention.

DETAILED DESCRIPTION

Figures 7, 8:
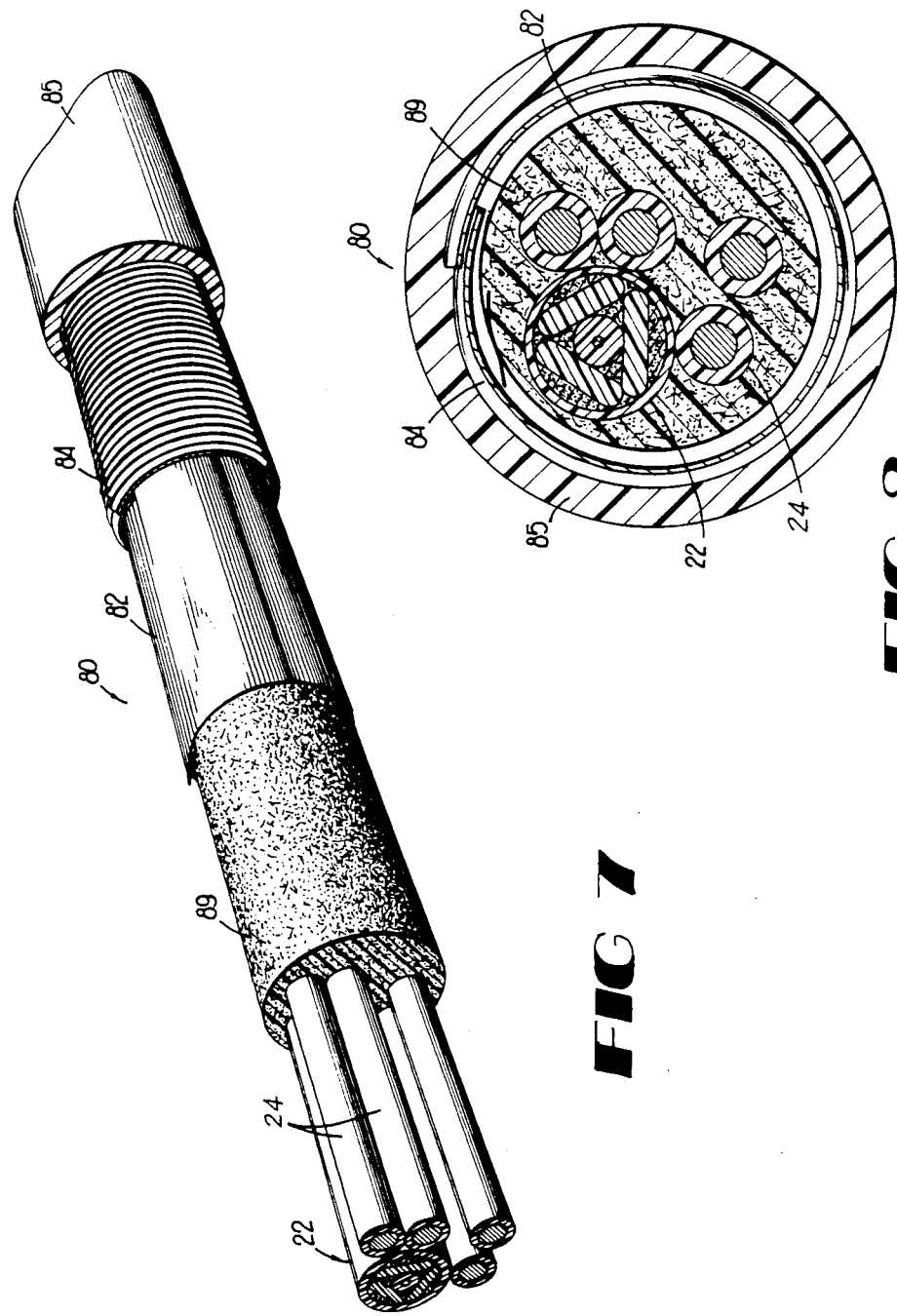
FIG. 7 is a perspective view of an alternative embodiment of the cable of this invention.
FIG. 8 is a cross sectional end view of the cable of FIG. 7.

Referring now to FIGS. 1 and 2, there is shown a cable being designated generally by the numeral 20 and having a core 21 which includes one or more reinforced optical fiber units each of which is designated generally by the numeral 22. The cable 20 is a composite cable which is suitable for distribution service to customer premises and includes the at least one reinforced optical fiber unit as well as one or more conductors. In another embodiment, the cable 20 may include at least one reinforced optical fiber unit and at least one or more pairs of insulated metallic conductors 24—24.

Referring now to FIGS. 3-5 there is shown in detail one of the reinforced optical fiber units 22—22. The reinforced optical fiber unit 22 includes an optical fiber which is designated generally by the numeral 30 and which includes a coating. In a preferred embodiment, the optical fiber 30 is provided with a buffer coating 34. The buffer coating 34 typically comprises a polyester elastomer or polyvinyl chloride (PVC) plastic which has been extruded over the coated optical fiber. Typically the buffered optical fiber which is designated by the numeral 36 has an outer diameter of about 0.035 inch.

The buffered optical fiber 36 is enclosed by a plurality of fiber glass strength members each designated by the numeral 40. As can be seen in FIG. 3, each of the fiber glass strength members has an elongate cross section transverse of its longitudinal axis with the cross section defined by parallel sides 42—42 and by arcuately shaped ends 44—44.

The strength members 40—40 must have suitable strength characteristics to prevent tensile load failure. Tensile load failure is caused by filament abrasion, flaws and tensile load imbalance. Filaments are abraded by neighboring filaments in the environment of use and by particles in a subsequently extruded jacket and is most severe under some conditions. Flaws occur with the probability that increases with the filament length and cause tensile load failures in a length of time which is approximately inversely proportional to the cable length. Uneven sharing of the tensile load results when the filaments are not coupled to share the tensile loads evenly. As some filaments break, others accept the load until the total cross section of the strength member fails.

Generally as a solution to these problems, impregnated rovings or yarns are used as strength members. Impregnating material may be formed by condensation or addition polymerization reactions and may include, for example, urethanes, acrylic acid or acrylate-based materials, epoxies, polyesters, and polyvinyl chloride or other vinyl based materials. For strength member materials such as fiber glass, a coupling agent or sizing such as silane must be used to couple the impregnating material to the filaments; for material such as KEVLAR® fiber, a coupling agent may not be required.

In a preferred embodiment, impregnated fiber glass rovings or yarns are used as strength members. Impregnating material coats each filament with a layer which protects against abrasion and couples each filament to its neighbor to bridge flaws and establish tensile load balance.

Fiber glass impregnation is customarily accomplished by fiber glass suppliers. Glass filaments are drawn from a furnace bushing and cooled by water spray followed by the application of a water dispersion of silane. Drying removes excess water and alcohol, which formed as the silane bonds the glass and leaves silane-coated filament with organo functional groups positioned to couple with the impregnating material. Each strength member is impregnated in a bath with the sized fibers being spaced apart to enhance the impregnation. For an example of a method of impregnating a bundle of filaments, see U.S. Pat. No. 4,479,984 which issued on Oct. 30, 1984 in the names of N. Levy and P. D. Patel and which is incorporated by reference hereinto.

Impregnating roving or yarn overcomes a disadvantage of plain roving or yarn for the strength members. Unlike plain roving or yarn, any flaws in any of the filaments are bridged by the impregnating material which also prevents abrasion. Impregnation increases the flex life of the completed structure over that of unimpregnated roving. The impregnating material also serves as part of the waterblocking system for the reinforced optical fiber unit.

The strength members are of a flattened shape because of the manner in which they are manufactured. The rovings or yarn are spread over a bar so that the roving afterwards appears flat. This design is beneficial in that it enhances the protection for the buffered optical fiber 36. Further as can be seen in FIG. 4, the strength members 40—40 are assembled to the optical fiber in such a manner as to have a lay along the length of the lightguide reinforced unit 22. In a preferred embodiment, the lay length is about 4 inches.

It also should be observed that the strength members are arranged in a particular fashion about the buffered optical fiber 36. They are arranged so as have a generally triangular configuration with one of the parallel sides of each being adjacent to the buffered optical fiber which is enclosed by the three strength members. A light touching of the strength members to the optical fiber is permissible, but anything more could cause a loading of the optical fiber and may result in microbending losses. Other arrangements are within the scope of this invention. For example, two or more arcuately shaped strength members could be disposed about the optical fiber as could four strength members which form a square cross section.

What is important is that the strength members are organized to provide a composite columnar strength member which resists compressive forces applied axially. Advantageously, the strength members also provide transverse compressive strength which prevents collapse of the unit as it is moved through the extruder or experiences bending. Also, the array of strength members function as a heat barrier during extrusion. The strength members must be decoupled sufficiently from the optical fiber to prevent the transfer of forces thereto. Decoupling also is important because of the relationship of the tightness between the sheath components and the optical fiber to the response time required for the optical fiber to return to a low stress state after having been stressed during bending or thermal cycling, for example.

The reinforced optical fiber unit 22 also includes a jacket which is designated generally by the numeral 50. The jacket may be made of a material such as PVC which has suitable resistance to flame spread and smoke evolution. Typically, the jacket comprises a nylon material, for example, in order to provide it with toughness and resistance to abrasion, impact and compression.

The reinforced optical fiber unit 22 is sized so that it may be an approximate size replacement for a copper distribution pair in a cable. The outside diameter of the jacket 50 is about 0.130 inch. The reinforced optical fiber unit 22 has been shown to include one optical fiber which is buffered. However, the unit may still have its same outer diameter, and the buffered fiber may be replaced with two or more unbuffered optical fibers. Or the buffer 34 which typically has an outer diameter of 0.035 inch may be replaced with one or more optical fibers each of which is enclosed by a thinner buffer layer.

Interposed between the jacket 50 and the strength members 40—40 of the reinforced optical fiber unit 22 and between the strength members and the buffered optical fiber 36 is a filling composition of matter 52. This composition of matter provides suitable waterblocking characteristics for the reinforced optical fiber unit 22. The filling material 52 must possess certain properties. It has been determined that in an optical fiber cable, a filling composition must also function to maintain the optical fibers in a relatively low state of stress. Such a material is a colloidal particle-filled grease composition disclosed in patent application Ser. No. 697,054 which was filed Jan. 31, 1985, and which is incorporated by reference hereinto. The composition of the waterblocking material 52 is intended to block effectively entry of water into the core while minimizing the added loss to the cable in order to provide excellent optical performance.

A grease typically is a solid or semiliquid substance comprising a thickening or gelling agent in a liquid carrier. The gelling agents used in greases frequently are fatty acid soaps, but high melting point materials, such as clays, silicas, organic dyes, aromatic amides, and urea derivatives also may be used.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide temperature range, e.g. from about $-40°$ to about 160° F. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. For a discussion of microbending loss, see S. E. Miller et, al., *Optical Fiber Telecommunications*, Academic Press, New York (1979), pp. 158-161. Typically, microbending loss is more difficult to control at long wavelengths than at short ones. Thus, it is important to be able to produce optical fiber cable that has no significant cabling-induced losses at long wavelengths such as, for example, 1.55 $\mu$m.

The preferred waterblocking material is a composition which comprises two major constituents, namely oil, and a gelling agent such as colloidal particles, and, optically, a bleed inhibitor. Preferably, the waterblocking composition includes a thermal oxidative stabilizer.

Among the oils useful in the waterblocking material are polybutene oils having a minimum specific gravity of about 0.83 and a maximum pour point, as per ASTM D97, of less than about 18° C., or ASTM type 103, 104A, or 104B, or mixtures thereof, per ASTM D-226 test, of naphthenic or paraffinic oils having a minimum specific gravity of about 0.86, and a maximum pour point, per ASTM D97, of less than about $-4°$ C. Specific examples of oils useful in the cable of the invention are a polybutene oil, which is a synthetic hydrocarbon oil having a pour point per ASTM D97 of $-35°$ C., an SUS viscosity of 1005 at 99° C., a specific gravity of 0.8509, and an average molecular weight of 460. It is available from the Amoco Chemical Corporation, Texas City, Tex., under the trade designation L-100. Another example oil is a white mineral oil, having a pour point per ASTM D97 of $-25°$ C., an SUS viscosity of 53.7 at 99° C., an average specific gravity of 0.884, and maximum aromatic oils 1% by weight (b.w.). The latter is available from Penreco of Butler, Pa., under the designation Drakeol 35. Other oils include triglyceride-based vegetable oils such as castor oil and other synthetic hydrocarbon oils such as polypropylene oils. For applications requiring fire-retardant properties, chlorinated paraffin oils having a chlorine content of about 30-75% b.w. and a viscosity at 25° C. of between 100 and 10,000 cps are useful. An example of such oil is Paroil 152, which is available from the Dover Chemical Company of Dover, Ohio.

Oil-retention of the inventive greases may be improved by the addition of one or more bleed inhibitors to the composition. The bleed inhibitor can be a rubber block copolymer, a relatively high viscosity semiliquid, sometimes referred to as semisolid, rubber, or other appropriate rubber. Block copolymers and semiliquid rubbers will be referred to collectively as rubber polymers. Incorporating a rubber polymer into the grease composition allows a reduction in the amount of colloidal particles that must be added to the mixture to prevent syneresis of the gel. This reduction can result in cost savings. Furthermore, it makes possible the formulation of nonbleeding compositions having a relatively low critical yield stress.

Among the rubber block copolymers that can be used in waterblocking compositions for the cable of the invention are styrene-rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution to about 2000 cps in a 15% b.w. rubber solution. Exemplary block rubbers are (a) a styrene-ethylene-propylene block copolymer (SEP), unplasticized, having a styrene/rubber ratio of about 0.59, a specific gravity of about 0.93, a breaking strength per ASTM D-412 of 300 psi, and being available from the Shell Chemical Company of Houston, Tex., under the trade designation Kraton G1701; (b) styrene-ethylene-butylene block copolymer (SEB), having a styrene/rubber ratio about 0.41, and being available from the Shell Chemical Company under the designation TRW-7-1511; (c) styrene-/ethylene-butylene-styrene block copolymer (SEBS), unplasticized, and having a styrene/rubber ratio of about 0.41, a specific gravity of about 0.91, 500% elongation, 300% modulus per ASTM D-412 of 700 psi, and being available from the Shell Chemical Corporation under the trade designation Kraton G1652. Other styrene-rubber of styrene-rubber-styrene block coploymers are styrene-isoprene rubber (SI) and styrene-isoprene-styrene (SIS) rubber, styrene-butadiene (SB) and styrene-butadiene-styrene (SBS) rubber. An example of SIS is Kraton D1107, and an example of SBS is Kraton D1102, both available from the Shell Chemical Company.

Among the semiliquid rubbers found useful are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, and available from the Exxon Chemical Company of Houston, Tex., under the trade designation Vistanex LM-MS. Other rubbers which are considered to be useful are butyl rubber, ethylene-propylene rubber (EPR), ethylene-propylene dimer rubber (EPDM), and chlorinated butyl rubber having a Monney viscosity ML 1+8 at 100° C. per ASTM D-1646 of between about 20 and 90. Examples of the above are Butyl 077, Vistalon 404, Vistalon 3708, and Chlorobutyl 1066, respectively, all available from the Exxon Chemical Company. Also useful are depolymerized rubbers having a viscosity of between about 40,000 and 400,000 cps at 38° C. An example thereof is DPR 75 available from Hardman, Inc. of Belleville, N.J.

Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior is often referred to as thixotropic.

Colloidal fillers useful in the cable of the invention include colloidal silica, either hydrophilic of hydrophobic, preferably a hydrophobic fumed silica having a BET surface area between about 50 and about 400 m²/gm. An example of a hydrophobic fumed silica is a polydimethylsiloxane-coated fumed silica having a BET surface area of about 80–120 m²/gm, containing about 5% b.w. carbon, and being available from the Cabot Corporation of Tuscola, Ill. under the trade designation Cab-O-Sil N70-TS. An exemplary hydrophilic colloidal material is fumed silica with a BET surface area of about 175–225 m²/gm, nominal particle size of 0.012 μm, and a specific gravity of 2.2, available from the Cabot Corporation under the designation Cab-O-Sil M-15. Other colloidal fillers useful in the practice of the invention are precipitated silicas and clays such as bentonites, with or without surface treatment.

FIG. 6 shows a generalized stress-strain curve 53 at constant strain rate for a thixotropic material such as that used as the waterblocking material 52, and identifies several important parameters. In segment 55 of the stress-strain curve 53, the material acts essentially an an elastic solid. The segment 55 extends from zero stress to the critical yield stress $\sigma_c$. The strain corresponding to $\sigma_c$ is identified as $\gamma_c$, the critical shear strain. By definition, the coordinates indicate the onset of yielding and the quantity $\sigma_c/\gamma_c$ (or $d\sigma/d\gamma$ for $\sigma < \sigma_c$) is known as the shear modulus ($G_e$) of the material.

The prior art teaches that filling materials for optical fiber cable need to have low values of $G_e$. However, it has been determined that, at least for some applications, a low value of $G_e$ of the filling material is not sufficient to assure low cabling loss, and that a further parameter, the critical yield stress, $\sigma_c$, also needs to be controlled. Typically, the critical yield stress of material according to the invention is not greater than about 70 Pa, measured at 20° C. whereas the shear modulus is less than about 13 kPa at 20° C.

A segment 56 of the stress-strain curve of FIG. 6 represents increasing values of the incremental strain for increasing stress. The stress $\sigma_y$ is the maximum value of stress sustainable by the material at a given strain rate with $\gamma_y$ being the corresponding strain. For strains in excess of $\gamma_y$, the stess at first decreases as shown by segment 58, becoming substantially independent of strain for still greater values of strain as shown by the segment 59. The waterblocking material thus exhibits a liquid like behavior for $\gamma > \gamma_y$.

A preferred filling composition 52 for the unit 22 typically comprises about 91.4 to 94.0% by weight (b.w.) oil and preferably about 92.8 to 93% by weight (b.w.) Drakeol 35 oil and about 6 to 8.5% b.w. colloidal filler and preferably about 6.9 to 7.1% of b.w. N70-TS hydrophobic fumed silica. The preferred composition also includes about 0.1% b.w. of an oxidative stabilizer. An exemplary stabilizer is tetrakis methane, available from CIBA-GEIGY under the trade designation Irganox 1010. Another composition which may be suitable for filling the unit 22 provides about 92.5 to 93.5% b.w. of an extender oil such as Drakeol 35, about 6.5 to 7.5% b.w. of a rubber such as Kraton G 1652 and 0.2% b.w. of an antioxidant such as Irganox 1010 or 1035 material. For the preferred composition, the following test values were obtained: (a) $\sigma_c$ (Pa)=10, $G_e$ (kPa)=1.8; (b)$\sigma_c$(Pa) =10 and $G_e$ (kPa)=1.8, time in hours=16.

The compositions were prepared by known methods, typically comprising the constituent materials first at ambient temperature and pressure, then at ambient temperature under a partial vacuum (typically less than about 300 Torr). The resulting compositions were evaluated, including a determination of $\sigma_c$ and $G_e$ of some by cone-and-plate rheometry. An exemplary summary of the properties also is presented hereinabove with all measurements of σc and Ge being at 20° C. The stress values designated (a) were determined without aging while those designated (b) were aged for the time indicated.

Advantageously, the waterblocking material 52 which is used to fill the core of the unit of this invention yields at a low enough stress so that the optical fiber 30 is capable of moving within the unit 22 when the unit is loaded or bent. Because the yielding filling material 52 allows the optical fiber to move within the unit 22, the stress therein is reduced, microbending is minimized and the life of the optical fiber is lengthened.

The filling material 52 for the reinforced optical fiber unit 22 also may be flame-retardant. This may be accomplished by including in the hereinbefore described composition a flame-retardant constituent such as chlorinated paraffin and/or $Al_2O_3 \cdot 3H_2O$.

As indicated hereinbefore, the distribution cable 20 includes one or more reinforced optical fiber units 22—22 and one or more metallic conductors and/or one or more twisted pairs of insulated metallic conductors 24—24 (see FIGS. 1 and 2). Viewing again FIGS. 1 and 2 it can be seen that each of the insulated conductors 24—24 includes a metallic portion 62 and insulation 64 which has been extruded thereover. Typically, each of the metallic conductor portions 62—62 is 22 AWG wire and is insulated with polyethylene plastic material, for example. The diameter-over-dielectric (DOD) of each insulated conductor 24 is such that the mutual capacitance of a pair of conductors insulated with the polyethylene is 0.083 $\mu$F/mile. As a result, the circuit length of the metallic pair can be about 7 miles which does not unduly limit the optical fiber length. Also, advantageously, each reinforced optical fiber unit 22 having an outer diameter of 0.130 inch can replace a conductor pair each of which has an outer diameter of 0.057 inch.

The distribution cable of this invention may include any of several sheath systems depending on the requirements of the environment of use. For example in FIG. 2, there is shown a distribution cable which includes the reinforced optical fiber unit and twisted metallic conductor pairs enclosed by a gopher-resistant sheath system designated 70 which includes a helically wrapped laminate 72 comprising copper and stainless steel. The copper-stainless steel, helically wrapped laminate 72 overlies an inner jacket 75 which may be made of high density polyethylene. Covering the outside of the copper-stainless steel laminate is an outer jacket of 76 which in a preferred embodiment is made of flame retardant polyvinyl chloride (PVC) plastic material. The outer diameter of the cable 20 is about 0.350 inch.

In an alternate embodiment designated generally by the numeral 80 (see FIGS. 7 and 8), the core which comprises the reinforced optical fiber unit or units 22—22 and the twisted metallic conductor pairs 24—24 includes an inner polyester plastic wrap 82 which is used to enclose the core. Over the polyester plastic core wrap 82 is disclosed a metallic shield 84 comprising in a preferred embodiment corrugated bronze having a longitudinal seam. Finally, the corrugated bronze shield 84 is enclosed in an outer jacket 85 which comprises a flame retardant PVC plastic material.

For all buried applications, the core is filled with a waterblocking composition of matter 89 (see FIGS. 2 and 8). Such a material may comprise Flexgel ® material which is disclosed and claimed in U.S. Pat. No. 4,176,240 which issued on November 1979 in the name of R. Sabia and which is incorporated by reference hereinto. As can be seen in aforementioned U.S. Pat. No. 4,176,240, the Flexgel filling compound comprises a mineral oil, styrene block copolymer rubber and polyethylene. Should the buried cable be routed adjacent to a customer's premises, the composition of matter should also include a chlorinated paraffin material comprising about 70% chlorine.

The distribution cable of this invention also may be used in an aerial fashion. Aerial cables which may be of the self-support style are well known. An aerial cable 90 (see FIG. 9) in accordance with this invention includes a core which comprises at least one reinforced optical fiber unit 22 and at least one pair of twisted insulated metallic copper conductors 24—24. The core is enclosed in a self-support arrangement which includes a plastic jacket 91 which includes a large diameter portion 92 that encloses the core and a smaller diameter portion 94 connected by a web 95. The smaller diameter portion 94 encloses a steel strength member 96 which is strung up between poles. Typically the plastic of the jacket which is sometimes referred to as a "figure 8" configuration is made of a flame retardant PVC plastic material. In this embodiment, the core need not be filled with a waterblocking material.

Another embodiment of an aerial service lightguide cable is depicted in FIG. 10 and is designated generally by the numeral 100. In it, a core may comprise a reinforced optical fiber unit which is enclosed in a jacket 102. The jacket configuration 102 is similar to that shown in the copending application Ser. No. 770,041 which was filed on Aug. 28, 1985 in the names of N. J. Cogelia, et al.

The aerial service cable 100 also includes a pair of strength members or support strands 106—106 which extend longitudinally. Each of the strength members 106—106 in the preferred embodiment of FIG. 10 comprises a fibrous strand material which is impregnated with a plastic material and is essentially the same as each of the strength members 40—40 except for the configuration. Each strength member 106 comprises a plurality of filaments which are gathered together. The filaments may be a material such as fiber glass of an organic material such as KEVLAR ® aramid fiber. Further, the filaments may be assembled together so that they extend generally parallel to the longitudinal axis of the strength member in which case they comprise a roving or twisted together to form a yarn. In a preferred embodiment, the members 106—106 which provide strength for the aerial service cable 100 each are comprised of a plurality of E-glass fibers. E-glass fibers comprise a borosilicate composition with the fibers having a minimum tensile strength of 200,000 psi. In a preferred embodiment, each strength member comprises about 8000 fibers.

As can be seen in FIG. 10, the reinforced optical fiber unit and the strength members 106—106 are enclosed in the jacket 102 comprising a plastic material which in a preferred embodiment is flame retardant polyvinyl chloride (PVC). The jacket 102 is generally rectangular in cross section and includes a first or neutral axis 112 which extends horizontally in FIG. 10 and a second axis 114 which is normal thereto. The jacket cross section has a width as measured in a direction parallel to the first axis 112 and a height as measured in a direction parallel to the second axis 114. Further, the jacket 102 is provided with enlarged end portions 116—116 at opposite ends of the axis 112. The enlarged portions 116—116 created troughs 118—118 which extend longitudinally of the wire. Also, the corners of the jacket are provided with chamfers 119—119.

The arrangement of the reinforced optical fiber unit 22 and of the strength members 106—106 within the jacket 102 is important. As is seen in FIG. 10, the reinforced optical fiber unit 22 is generally disposed adjacent to a longitudinal axis 120 of the jacket which passes through a geometric center of each jacket cross section through which the first axis 112 also passes.

Also of importance is the disposition of the strength members 106—106 with respect to the reinforced optical fiber unit 22 and the jacket 102. As shown, they are disposed along the axis 112 and outboard of the optical fiber unit 22. Each strength member 106 is disposed along the axis 112 between the reinforced optical fiber unit 22 and the outer surface of the jacket. Because the strength members and the longitudinal axis intersect the axis 112 of each jacket cross section, the strength members and the longitudinal axis which is interposed therebetween are aligned. Further, each strength member 106 is disposed within one of the enlarged end portions 116—116, which are referred to as support columns. As a result, compressive forces provided by a support clamp are aligned with the support columns 116—116 and the strength members 116—116 therein. The reinforced optical fiber unit 22 is further protected against compressive loading of the support clamp by the troughs 118—118.

The aerial service cable 100 forms generally a catenary between two wedge-type support clamps (not shown). The load due to the weight of the length of the aerial service cable in the catenary causes forces to be exerted between the clamps and the ends of the aerial service cable. Each clamp engages the outer surface of the jacket 102. It should be apparent that if there is insufficient adhesion between the jacket 102 and the strength members 106—106, the reaction of the clamp on the aerial service cable due to combined effects of cable weight and any ice and wind loading could cause the jacketing material to be pulled therefrom leaving the optical fiber unit unprotected and perhaps causing the cable to fall. It follows that the jacketing composition must have at least a sufficient minimum adhesion to the strength members 106—106. Not only must the strength members 106—106 be suitably adhered to the jacket 102, they must also have suitable strength characteristics to prevent static load failure discussed hereinbefore with respect to the strength members for the reinforced optical fiber unit 22.

As a solution to these problems, impregnated rovings or yarns are used as strength members. The material which is used to impregnate the strength members must be such that the strength members are coupled to the jacket sufficiently so that there is no rupture, nor slippage after a 290 pound tensile load has been applied to the aerial service transmission medium through support clamps for a 24 hour period at room temperature. Also, the material used to impregnate the strength members must be a material that will couple to the jacket 102. Also, it must exhibit a relatively high coefficient of static friction with the material of the jacket 102. Further it must have hydrolytic stability. The impregnating material may be the same as that used to impregnate the optical fiber unit 22.

In the impregnated roving or yarn for the strength members 106—106, unlike plain roving or yarn, any flaws in any of the filaments are bridged by the impregnating material which also prevents abrasion. There is sufficient adhesion of the jacket 102 to the strength members 106—106 to allow suitable transfer of forces to the strength members from the clamps. Further, the flex life of an aerial service cable which includes impregnated strength members is, at expected maximum surface temperatures, about ten times that of one which includes strength members that are not impregnated.

The aerial service cable 100 provides other advantages. It has a flame-retardant jacket. Reinforced optical fiber units are positioned for protection against impact and abrasion. Another advantage relates to handling criteria. The unprotected hands of a craftsperson preparing the cable for termination are not exposed to the filaments as the jacket is removed to access the optical fiber unit.

The use of a nylon jacketed reinforced optical fiber unit avoids problems with a prior art aerial service wire wherein a single plastic material was used to provide insulation for copper-clad steel conductors and a jacket. The plastic material had to be tough, have adequate low temperature flexibility, acceptable resistance to compression, ultra-violet resistance, acceptable weatherability, adequate flame-retardance because of the installation adjacent to customer's premises and high insulation resistance to insulate the conductors. Inasmuch as each function, insulating and jacketing, was required to provide particular properties, comprises were made to accomodate both functions with a single material. In the aerial service cable 100, the nylon material is a jacket for the reinforced optical fiber unit and the polyvinyl chloride an excellent jacketing material. Furthermore, the nylon does not bond to the polyvinyl chloride and thereby allows slippage between the reinforced optical fiber unit and the jacket.

It should also be pointed out that another advantage of the aerial service cable which is shown in FIG. 10 is that the reinforced optical fiber unit may be accessed by one of several methods. For example, it may be accessed by a split method at normal temperatures or a clip-twist method at relatively low temperatures such as those in the range of 0° to −20°0 F. In the split method, a craftsman makes a cut with diagonal pliers into a jacket between the support columns. Afterwards the craftsperson grasps a support column in each hand and applies forces to separate one support column from the other which is effective to separate out the reinforced optical fiber unit 22. In the clip-twist method, the craftsperson uses the pliers to cut the jacket from each of its sides to the troughs which are centered over the unit 22. Then the craftsperson twists the wire to break any connection to the center portion of the jacket, pulls the separated jacket portion away leaving the reinforced optical fiber unit.

Although the foregoing embodiments depict a reinforced optical fiber unit 22 disposed in a distribution or service cable, it should be noted that it also may be used as a stand-alone unit in outside telephone plant or in buildings, or one or more such units may be used in outside telephone plant exchange cable or in multi-pair building cable. For use in a building, the unit 22 need not be filled with a waterblocking material but it must be flame retardant. This may be accomplished with a flame retardant buffer coating and a flame retardant jacket 50 and any one of several underlying tapes, if necessary, which retard flame spread and smoke evolution. On the other hand, for outside plant, the unit 22 preferably is filled with a waterblocking material and if it becomes disposed adjacent to a building, must be flame retardant. The reinforced optical fiber unit also may be used as inside wiring in a customer's premises. Further, because of its size and robustness, a reinforced optical fiber unit 22 may be incorporated into a presently used copper or optical fiber exchange cable.

Figure 11:
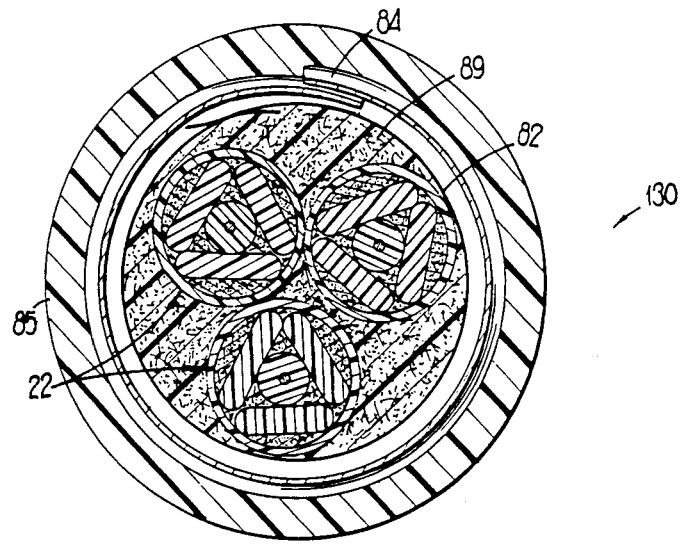
FIGS. 11 and 12 are cross sectional end views of still other embodiments of the cable of this invention.
Figure 12:
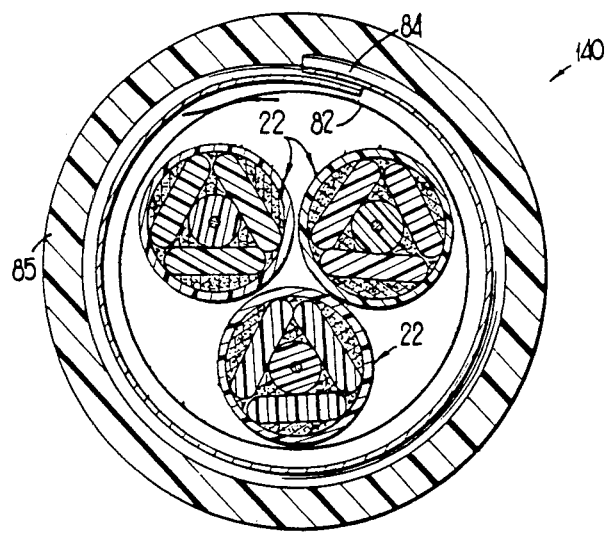

FIGS. 11 and 12 depict other embodiments of the cable of this invention. In FIG. 11 there is shown a cable 130 which includes a plurality of the reinforced optical fiber units 22—22 enclosed in a sheath system such as the sheath system shown in FIG. 8. The cable 130 also includes a waterblocking material which may be the waterblocking material 89. In FIG. 12, a cable 140 includes a plurality of reinforced optical fiber units 22—22 enclosed in a sheath system such as that of the cable in FIG. 8 without waterblocking material within the core among the optical fiber units.

It is to be understood that the above-described arrangements are simply illustrative of the invention. Other arrangements may be devised by those skilled in the art which will embody the principles of the invention and fall within the spirit and scope thereof.

What is claimed is:

1. A composite optical fiber, metallic conductor cable, which comprises:
    a core which comprises:
        at least one reinforced optical fiber unit, which comprises:
            at least one optical fiber;
            a plurality of discrete impregnated fibrous strength members which cooperate to provide an innermost enclosure for and which are decoupled from said at least one optical fiber without the intervention of any solid member between said at least one optical fiber and said strength members, said strength members providing tensile strength and columnar strength which resists compression; and
            a jacket which is made of plastic material and which encloses said strength members; and
        at least one metallic conductor; and
    a sheath system which enclosures said at least one optical fiber unit and said at least one metallic conductor and which includes an outer plastic jacket.

2. The cable of claim 1, wherein said core includes at least one twisted pair of insulated metallic conductors.

3. The cable of claim 1, wherein said at least one optical fiber is provided with a coating of plastic material and with a buffer layer of a plastic material.

4. The cable of claim 1, which also includes a waterblocking material which is disposed within said jacket to fill intertices between said jacket and said strength members and between the strength members and said optical fiber.

5. The cable of claim 4, wherein said waterblocking material is a composition of matter which comprises about 91.4 to 94% by weight of an oil selected from the group consisting of:
    (a) paraffinic oil having a minimum specific gravity of about 0.86 and a pour point less than −4° C. and being of ASTM type 103, 104A or 104B;
    (b) naphthenic oil having a minimum specific gravity of about 0.86 and a pour point less than −4° C. and being of ASTM type 103, 104A or 104B;
    (c) polybutene oil having a minimum specific gravity of about 0.83 and a pour point less than 18° C.; and
    (d) any mixture thereof.

6. The cable of claim 4, wherein said waterblocking material is a composition of matter which comprises:
    (a) about 92.8 to 93% by weight of an oil selected from the group consisting of:
        i. paraffinic oil having a minimum specific gravity of about 0.86 and a pour point of less than −4° C. and being of ASTM type 103, 104A, or 104B;
        ii. naphthenic oil having a minimum specific gravity of about 0.86 and a pour point less than −4° C. and being of ASTM type 103, 104A or 104B;
        iii. polybutene oil having a miminum specific gravity of about 0.83 and a pour point of less than 18° C.;
        iv. triglyceride-based vegetable oil;
        v. polypropylene oil;
        vi. chlorinated paraffin oil having a chlorine content between about 30 and 75% by weight and a viscosity at 25° C. of between 100 and 10,000 cps;
        vii. polymerized esters, and
        viii. any mixture thereof; and
    (b) about 0.1% by weight of an antioxidant stabilizer.

7. The cable of claim 5, wherein said composition also includes about 6.9 to 7.1% by weight of hydrophobic fumed silica colloidal particles.

8. The cable of claim 5, which also includes not more than about 8% by weight of a bleed inhibitor selected from the group consisting of styrene-rubber-styrene block copolymers having a styrene/rubber ratio between about 0.1 and about 0.8, semiliquid rubber having a Flory molecular weight between 20,000 and 70,000, butyl rubber, ethylene-propylene rubber, ethylene-propylene dimer rubber, chlorinated butyl rubber having a Mooney viscosity at 100° C. between about 20 and 90, and depolymerized rubber having a viscosity at 38° C. between about 40,000 and 400,000 cps.

9. The cable of claim 1, wherein said cable includes two non-metallic strength members each of which comprises a plurality of filaments that are gathered together and each of which is impregnated with a plastic material that causes it to be coupled to said outer jacket, each of said strength members being disposed between said reinforced optical fiber unit and an outer surface of said outer jacket such that the strength members and a longitudinal axis of the cable which is interposed therebetween are aligned.

10. The cable of claim 9, wherein the longitudinal axis passes through a geometric center of each cross section of said outer jacket which is tranverse to the longitudinal axis with each strength member passing through each cross section along an axis which spans the cross section and which extends through the geometric center thereof, and wherein the cross section is generally rectangular being defined by a width and a height with the axis which spans the outer jacket cross section extending along said width, the height of end portions of the cross section being greater than the height of a center portion which connects the end portions.

11. The cable of claim 10, wherein each of the strength members is disposed within one of the end portions and said reinforced optical fiber unit is disposed adjacent to the geometric center of the cross-section.

12. The cable of claim 11, wherein the width is greater than the height of the cross section of the outer jacket.

13. The cable of claim 11, wherein each of said strength members is impregnated with a matrial which is compatible with the material of which the outer jacket is comprised.

14. The cable of claim 1, wherein said sheath system includes an outer jacket which includes a portion in which a metallic strength member which is used to support said cable in an aerial installation is embedded.

15. The cable of claim 1, wherein said sheath system includes a metallic shield.

16. The cable of claim 1, wherein said reinforced optical fiber unit has an outer diameter which does not exceed about 0.140 inch.

17. The cable of claim 1, wherein said core include a plurality of said reinforced optical fiber units.

18. The cable of claim 1, which also includes a waterblocking material which is disposed within said core between said reinforced optical fiber unit and said sheath system.

19. A composite optical fiber, metallic conductor cable, which comprises:
   a core which comprises:
      at least one reinforced optical fiber unit, which comprises:
         at least one optical fiber;
         a strength member system comprising a plurality of discrete impregnated fibrous strength members which cooperate to enclose said at least one optical fiber and being decoupled therefrom to provide tensile strength and to provide columnar strength which resists compression, wherein said strength member system includes three impregnated fiber glass strength members each having a cross section which includes two generally parallel sides which are joined at their ends by arcuate portions, each strength member being adjacent to said optical fiber to form a triangular array and wherein jacket touches generally the spices of the triangular array; and
         a jacket which is made to plastic material and which encloses said strength members; and
      at least one metallic conductor; and
   a sheath system which encloses said at least one optical fiber unit and said at least one metallic conductor and which includes an outer plastic jacket.

20. A composite optical fiber, metallic conductor cable, which comprises:
   a core which comprises:
      at least one reinforced optical fiber unit, which comprises:
         at least one optical fiber;
         a plurality of discrete impregnated fibrous strength members which cooperate to enclose said at least one optical fiber and being decoupled therefrom to provide tensile strength and to provide columnar strength which resists compression;
         a jacket which is made of plastic material and which encloses said strength members; and
         a waterblocking material which is disposed within said jacket to fill interstices between said jacket and said strength members and between the strength members and said optical fiber, wherein said waterblocking material is a composition of matter which comprises about 91.4 to 95% by weight of an oil selected from the group consisting of:
         (a) paraffinic oil having a mimimum specific gravity of about 0.86 and a pour point less than −4° C. and being of ASTM type 103, 104A or 104B;
         (b) naphthenic oil having a minimum specific gravity of about 0.86 and a pour point less than −4° C. and being of ASTM type 103, 104A or 104B;
         (c) polybutene oil having a minimum specific gravity of about 0.83 and a pour point less than 18° C.; and
         (d) any mixture thereof, and wherein said composition of matter also includes about 6 to 8.5% by weight colloidal particles selected from the group consisting of hydrophobic fumed silica, hydrophilic fumed silica, precipitated silica and clay, the colloidal particles having a BET surface area in the range from about 50 to about 400 m$^2$;
      at least one metallic conductor; and
   a sheath system which encloses said at least one optical fiber unit and said at least one metallic conductor and which includes an outer plastic jacket encloses the strength members.

21. An optical fiber cable, which comprises:
   a core which comprises at least one reinforced optical fiber unit, said at least one reinforced optical fiber unit comprising:
      at least one optical fiber;
      a strength member system including a plurality of discrete impregnated fibrous strength members which cooperate to enclose said optical fiber without the intervention of any other solid member between said optical fiber and said strength member system while being decoupled therefrom to provide tensile strength and to provide columnar strength which resists compression; and
      a jacket which is made of plastic material and which encloses said strength members; and
   a sheath system which encloses said at least one reinforced optical fiber unit and which includes an outer plastic jacket.

22. A reinforced optical fiber unit, which comprises:
   at least one optical fiber;
   a strength member system including a plurality of discrete impregnated fibrous strength members which cooperate to enclose said optical fiber without the intervention of another solid member between said optical fiber and said strength member system while being decoupled therefrom to provide tensile strength and to provide columnar strength which resists compression; and
   a jacket which is made of plastic material and which encloses the strength members.

23. The optical fiber unit of claim 22, which also includes a waterblocking material which is disposed within said jacket to fill intertices between said jacket and said strength members and between the strength members and the optical fiber.

24. The optical fiber unit of claim 23, wherein said waterblocking material is a composition of matter which comprises about 91.4 to 94% by weight of an oil selected from the group consisting of:
   (a) paraffinic oil having a minimum specific gravity of about 0.86 and a pour point less than −4° C. and being of ASTM type 103, 104A or 104B;
   (b) naphthenic oil having a minimum specific gravity of about 0.86 and a pour point less than "4° C. and being of ASTM type 103, 104A or 104B;
   (c) polybutene oil having a minimum specific gravity of about 0.83 and a pour point less than 18° C.; and
   (d) any mixture thereof.

25. A reinforced optical fiber unit, which comprises:
   at least one optical fiber;

a strength member system including a plurality of discrete impregnated fibrous strength members which cooperate to enclose said optical fiber while being decoupled therefrom to provide tensile strength and to provide columnar strength which resists compression, wherein said strength member system include three inpregnated fiber glass strength members each having a cross section which includes two generally parallel sides which are jointed at their ends by arcurate portions, each strength member being positioned with respect to said optical fiber to form a triangular array; and a jacket which is made of plastic material and encloses the strength member.

26. A reinforced optical fiber unit, which comprises:
at least one optical fiber;
a strength member system including a plurality of discrete impregnated fibrous strength members which cooperate to enclose said optical fiber while being decoupled therefrom to provide tensile strength and to provide columnar strength which resists compression;
a jacket which is made of plastic material and which encloses the strength members; and
a waterblocking material which is disposed within said jacket to fill interstices between said jacket and said strength members and between the strength members and the optical fiber; wherein said waterblocking material is a composition of matter which comprises about 91.4 to 94% by weight of an oil selected from the group consisting of:
(a) paraffinic oil having a minimum specific gravity of about 0.86 and a pour point less than $-4°$ C. and being of ASTM type 103, 104A or 104B;
(b) naphthenic oil having a minimum specific gravity of about 0.86 and a pour point less than and being of ASTM type 103, 104A or 104B;
(c) polybutene oil having a minimum specific gravity of about 0.83 and a pour point less than
(d) any mixture thereof, and wherein said composition also includes about 6.9 to 7.1% by weight of hydrophobic fumed silica colloidal particles.

27. A reinforced optical fiber unit, which comprises:
at least one optical fiber;
a strength member system including a plurality of discrete impregnated fibrous strength members which cooperate to enclose said optical fiber while being decoupled therefrom to provide tensile strength an to provide columnar strength which resists compression:
a jacket which is made of plastic material and which encloses the strength members; and
a waterblocking material which is disposed within said jacket to fill interstices between said jacket and said strength members and between the strength members and the optical fibers, wherein said waterblocking material is a composition of matter which comprises:
(a) about 92.8 to 93% by weight of an oil selected from the group consisting of:
  i. paraffinic oil having a minimum specific gravity of about 0.86 and a pour point less than $-4°$ C. and being of ASTM type 103, 104A, or 104B;
  ii. naphthenic oil having a minimum specific gravity of about 0.86 and a pour point less than $-4°$ C. and being of ASTM type 103, 104A, or 104B;
  iii. polybutene oil having a minimum specific gravity of about 0.83 and a pour point of less than 18° C.;
  iv. triglyceride-based vegetable oil;
  v. polypropylene oil;
  vi. chlorinated paraffin oil having a chlorine content between about 30 and 75% by weight and a viscosity of 25° C. of between 100 and 10,000 cps;
  vii. polymerized esters, and
  viii. any mixture thereof; and
(b) about 0.1% by weight of an antioxidant stabilizer.

28. The optical fiber unit of claim 27, wherein said composition of matter also includes about 6 to 8.5% by weight colloidal particles selected from the group consisting of hydrophobic fumed silica, hydrophilic fumed silica, precipitated silica, and clay, the colloidal particles having a BET surface area in the range from about 50 to about 400 m²/g.

* * * * *